United States Patent
Krishnaswamy et al.

(10) Patent No.: US 10,114,532 B2
(45) Date of Patent: Oct. 30, 2018

(54) EDITING OPTIONS FOR IMAGE REGIONS

(71) Applicant: Google Inc., Mountain View, CA (US)

(72) Inventors: Aravind Krishnaswamy, San Jose, CA (US); David Gary Besbris, Cupertino, CA (US)

(73) Assignee: Google LLC, Mountain View, CA (US)

(*) Notice: Subject to any disclaimer, the term of this patent is extended or adjusted under 35 U.S.C. 154(b) by 690 days.

(21) Appl. No.: 14/099,797

(22) Filed: Dec. 6, 2013

(65) Prior Publication Data
US 2015/0160839 A1    Jun. 11, 2015

(51) Int. Cl.
*G06F 3/0484*    (2013.01)
*G06F 3/0482*    (2013.01)

(52) U.S. Cl.
CPC ........ *G06F 3/04845* (2013.01); *G06F 3/0482* (2013.01)

(58) Field of Classification Search
CPC ..... G06T 7/004; G06T 7/0042; G06T 7/0044; G06T 7/0046; G06T 7/11; G06T 7/73; G06T 2207/30201; G06T 7/12; G06T 7/194; G06T 11/60; G06T 2200/24; G06F 3/04845; G06F 3/04842
See application file for complete search history.

(56) References Cited

U.S. PATENT DOCUMENTS

| | | | | |
|---|---|---|---|---|
| 6,049,335 A | * | 4/2000 | Iida | G06F 3/0482 715/811 |
| 6,097,853 A | * | 8/2000 | Gu | G06F 3/04845 382/199 |
| 6,167,167 A | * | 12/2000 | Matsugu | H04N 19/503 358/538 |
| 6,587,593 B1 | * | 7/2003 | Matsuoka | G06T 5/50 382/260 |
| 6,941,015 B1 | * | 9/2005 | Kim | G06T 7/66 382/190 |
| 7,024,051 B2 | * | 4/2006 | Miller | G06F 8/60 348/E5.042 |

(Continued)

OTHER PUBLICATIONS

Young, Nicole S., "Plug In with onOne Software: Using Perfect Portrait," Pearson Education, Peachpit, Jan. 7, 2013.

(Continued)

*Primary Examiner* — Ajay M Bhatia
*Assistant Examiner* — Phoebe X Pan
(74) *Attorney, Agent, or Firm* — IP Spring

(57) ABSTRACT

Implementations relate to editing options for image regions. Some implementations include detecting a region portion of an image based on one or more characteristics of pixels of the image. The detected region has an identified class selected from multiple identifiable classes, and each identifiable class is associated with a set of multiple editing options. Each editing option is associated with edit operation(s) operable to adjust value(s) of one or more image pixels. One of the sets of editing options is presented for selection, where the presented set is associated with the identified class of the detected region and each of the editing options in the presented set is operable to adjust value(s) of one or more pixels of the detected region. The presented set of editing options is different from at least one of the other sets of editing options associated with the other classes.

18 Claims, 6 Drawing Sheets

(56) References Cited

U.S. PATENT DOCUMENTS

| | | | | |
|---|---|---|---|---|
| 7,035,461 B2* | 4/2006 | Luo | G06K 9/00228 | 382/164 |
| 7,062,085 B2* | 6/2006 | Luo | G06K 9/38 | 382/165 |
| 7,379,071 B2* | 5/2008 | Liu | G06T 13/40 | 345/582 |
| 7,574,016 B2 | 8/2009 | Steinberg et al. | | |
| 7,593,603 B1* | 9/2009 | Wilensky | G06T 11/60 | 358/1.2 |
| 7,693,341 B2 | 4/2010 | Pettigrew et al. | | |
| 7,853,078 B2* | 12/2010 | Fujii | H04N 1/622 | 382/167 |
| 7,860,309 B1* | 12/2010 | Bodnar | G06K 9/00677 | 358/538 |
| 8,004,536 B2* | 8/2011 | Wilensky | G06F 3/04842 | 345/589 |
| 8,175,409 B1* | 5/2012 | Wilensky | G06T 7/0083 | 382/274 |
| 8,379,130 B2 | 2/2013 | Forutanpour et al. | | |
| 8,566,329 B1* | 10/2013 | Freed | G06F 17/3053 | 707/748 |
| 8,570,339 B2 | 10/2013 | Braun et al. | | |
| 8,605,940 B1* | 12/2013 | Wilensky | G06T 7/0083 | 382/100 |
| 8,687,887 B2* | 4/2014 | Norimatsu | G06K 9/4628 | 348/333.01 |
| 9,355,469 B2* | 5/2016 | Tighe | G06F 3/0481 | |
| 2001/0019338 A1* | 9/2001 | Roth | G06F 3/0482 | 715/811 |
| 2002/0081040 A1* | 6/2002 | Uchida | G06T 11/60 | 382/311 |
| 2003/0053686 A1* | 3/2003 | Luo | G06K 9/38 | 382/165 |
| 2003/0099411 A1* | 5/2003 | Kokemohr | G06F 3/04845 | 382/309 |
| 2003/0223622 A1* | 12/2003 | Simon | G06K 9/00281 | 382/118 |
| 2004/0146198 A1* | 7/2004 | Herley | G06K 9/32 | 382/173 |
| 2006/0004914 A1* | 1/2006 | Kelly | G06Q 30/00 | 709/219 |
| 2006/0098941 A1* | 5/2006 | Abe | G11B 27/031 | 386/279 |
| 2006/0238625 A1* | 10/2006 | Sasaki | H04N 1/00416 | 348/231.3 |
| 2006/0251299 A1* | 11/2006 | Kinjo | G06K 9/00221 | 382/118 |
| 2006/0271691 A1* | 11/2006 | Jacobs | H04N 1/00132 | 709/228 |
| 2006/0277492 A1* | 12/2006 | Matthews | G06F 3/0482 | 715/789 |
| 2007/0041638 A1* | 2/2007 | Liu | G06K 9/6282 | 382/170 |
| 2007/0168877 A1* | 7/2007 | Jain | G06F 3/0482 | 715/772 |
| 2007/0174775 A1* | 7/2007 | McAlpine | G06T 17/00 | 715/723 |
| 2007/0230794 A1* | 10/2007 | McAlpine | G06T 11/60 | 382/190 |
| 2007/0258656 A1* | 11/2007 | Aarabi | G06K 9/00228 | 382/254 |
| 2008/0036757 A1* | 2/2008 | Furukawa | G11B 27/105 | 345/418 |
| 2008/0057947 A1* | 3/2008 | Marolia | H04L 67/34 | 455/425 |
| 2008/0131004 A1* | 6/2008 | Farmer | G06K 9/00362 | 382/224 |
| 2008/0148154 A1* | 6/2008 | Burrell | H04L 12/1895 | 715/733 |
| 2008/0170044 A1* | 7/2008 | Kanada | G03G 15/5016 | 345/173 |
| 2009/0096808 A1 | 4/2009 | Winn | | |
| 2009/0324022 A1* | 12/2009 | Sangberg | G06F 17/30265 | 382/118 |
| 2009/0324103 A1* | 12/2009 | Gelfand | G06F 17/30265 | 382/224 |
| 2010/0054600 A1* | 3/2010 | Anbalagan | G06Q 10/10 | 382/180 |
| 2010/0054601 A1* | 3/2010 | Anbalagan | G06F 17/30265 | 382/180 |
| 2010/0153847 A1* | 6/2010 | Fama | G06L 13/40 | 715/719 |
| 2010/0158379 A1* | 6/2010 | Hatfield | G06T 7/0081 | 382/190 |
| 2010/0231753 A1* | 9/2010 | Hagiwara | H04N 5/232 | 348/231.6 |
| 2010/0232712 A1* | 9/2010 | Tomita | G06K 9/00228 | 382/209 |
| 2010/0246965 A1* | 9/2010 | Epshtein | G06F 17/30796 | 382/187 |
| 2010/0287053 A1* | 11/2010 | Ganong | G06F 17/30247 | 705/14.66 |
| 2010/0287163 A1* | 11/2010 | Sridhar | G06Q 30/02 | 707/740 |
| 2011/0016426 A1* | 1/2011 | Grosz | G06F 17/3028 | 715/821 |
| 2011/0032373 A1* | 2/2011 | Forutanpour | G11B 27/034 | 348/222.1 |
| 2011/0106721 A1* | 5/2011 | Nickerson | G06Q 30/02 | 705/347 |
| 2011/0182482 A1* | 7/2011 | Winters | G06F 17/30256 | 382/116 |
| 2011/0216976 A1* | 9/2011 | Rother | G06K 9/34 | 382/173 |
| 2011/0243397 A1* | 10/2011 | Watkins | G06F 17/30259 | 382/118 |
| 2011/0268369 A1* | 11/2011 | Richards | G06T 5/005 | 382/284 |
| 2011/0282867 A1* | 11/2011 | Palermiti, II | G06F 17/30268 | 707/722 |
| 2012/0033875 A1* | 2/2012 | Bergman | G06T 7/0081 | 382/164 |
| 2012/0047233 A1* | 2/2012 | Jin | G06F 11/00 | 709/219 |
| 2012/0081554 A1 | 4/2012 | Berman et al. | | |
| 2012/0128248 A1* | 5/2012 | Hamada | G06T 7/0079 | 382/173 |
| 2012/0139900 A1* | 6/2012 | Matsui | H04N 13/0011 | 345/419 |
| 2012/0158700 A1* | 6/2012 | Dodson | G06K 9/00288 | 707/722 |
| 2012/0254910 A1* | 10/2012 | Donoghue | H04H 60/31 | 725/14 |
| 2012/0274863 A1* | 11/2012 | Chardon | G06F 17/30011 | 348/734 |
| 2012/0299942 A1* | 11/2012 | Braun | G06T 11/001 | 345/589 |
| 2013/0027571 A1* | 1/2013 | Parulski | H04N 5/232 | 348/207.11 |
| 2013/0061259 A1* | 3/2013 | Raman | H04H 60/32 | 725/14 |
| 2013/0074005 A1* | 3/2013 | Whitman | G06F 3/0481 | 715/799 |
| 2013/0205248 A1* | 8/2013 | Moon | G06F 3/04815 | 715/782 |
| 2013/0259374 A1* | 10/2013 | He | G06K 9/34 | 382/173 |
| 2014/0082503 A1* | 3/2014 | Tan | H04L 41/22 | 715/736 |
| 2014/0176750 A1* | 6/2014 | Pajak | H04N 5/225 | 348/222.1 |
| 2015/0117777 A1* | 4/2015 | Hsun | G06T 11/60 | 382/173 |
| 2015/0170006 A1* | 6/2015 | Cohen | G06F 17/30247 | 382/180 |

(56) References Cited

U.S. PATENT DOCUMENTS

| | | | |
|---|---|---|---|
| 2015/0193510 A1* | 7/2015 | Raess ................ | G06F 17/30554 |
| | | | 707/727 |
| 2015/0235110 A1* | 8/2015 | Curtis ................ | G06K 9/00677 |
| | | | 382/224 |
| 2017/0039867 A1* | 2/2017 | Fieldman ............... | G09B 5/065 |

OTHER PUBLICATIONS

Willis, David, "Mastering Control Points," Digital Photo Magazine, Werner Publishing Corp., Aug. 16, 2011.

European Patent Office; International Search Report and Written Opinion EPO (ISA) related PCT/US2014/068104 dated Mar. 27, 2015, 12 Pages.

International Bureau of WIPO, International Preliminary Report on Patentability for International Patent Application No. PCT/US2014/068104, dated Jun. 7, 2016, 8 pages.

SIPO, First Office Action (with English translation) for Chinese Patent Application No. 201480066599.7, dated Jul. 27, 2018, 29 pages.

\* cited by examiner

EDITING OPTIONS FOR IMAGE REGIONS

BACKGROUND

The popularity and convenience of digital cameras as well as the widespread of use of Internet communications have caused digital images to become ubiquitous. For example, user-produced digital photographs are posted to various Internet sites, such as web pages, social networking services, etc. for users and others to view. However, many images, such as photographs taken by a camera, can include various features unsatisfying to a user. For example, a face captured in an image may be too bright, have too much contrast, include undesired facial marks, etc. Or, a sky may be shown as too dark. To improve images, a user commonly edits images directly by opening an image in an editor program and manually adjusting various characteristics of particular regions of the image, such as brightness, contrast, saturation, clarity or blurring amounts, etc. in regions such as faces, objects, or distinguishable areas.

SUMMARY

Implementations of the present application relate to editing options for image regions. In some implementations, a method includes detecting a region portion of an image based on one or more characteristics of one or more pixels of the image. The detected region has an identified class selected from multiple identifiable classes, and each of the plurality of identifiable classes is associated with a set of multiple editing options. Each editing option is associated with one or more edit operations operable to adjust one or more values of one or more pixels of an image. The method includes presenting one of the sets of editing options for selection, where the presented set of editing options is associated with the identified class of the detected region and each of the editing options in the presented set is operable to adjust one or more values of one or more pixels of the detected region. The presented set of editing options is different from at least one of the other sets of editing options associated with the other classes.

Various implementations and examples of the method are described. For example, detecting the region can include examining multiple different image characteristics to detect the region and determine its class. The image characteristics can include texture provided by colors of pixels in the image, luminance of pixels in the image, hue of pixels in the image, and/or location of the detected region with respect to one or more borders of the image. Detecting the region can include automatically segmenting the image into multiple regions including the detected region, and automatically identifying the classes of the segmented regions.

At least one of the sets of editing options can include multiple different types of editing options, each type of editing option including one or more edit operations different from edit operations of the other types of editing options. In some implementations, at least one of the sets of editing options can include at least one type of editing option that is different from the types of editing options in at least one of the other sets. The presented set of editing options can be predetermined to be appropriate for the identified class of the region. For example, the determined class can be facial skin, and the presented set of editing options can include a smoothing operation. At least one of the presented editing options can be a type of editing option that does not adjust the color appearance of the region. At least one of the presented editing options can include a convolution operation that changes a pixel value of a first pixel in the detected region and changes a pixel value of at least one pixel in the region neighboring the first pixel. For example, the convolution operation can include a blur operation that blurs a pixel and a plurality of neighboring pixels in the detected region, a noise reduction operation that reduces noise in the detected region, a local contrast enhancement operation that adjusts the contrast of one or more pixels in the detected region relative to pixels neighboring the one or more pixels in the detected region, and/or a sharpening operation that causes a pixel value to differ from one or more neighboring pixels.

The set of editing options can be presented for selection in response to receiving user input indicating the region in the image. The user input can include hovering a pointer over the region or tapping the region. The method can include receiving a selection of one of the presented editing options and causing editing operations associated with the selected editing option to be performed on the detected region.

The method can include examining previously-selected editing options selected by one or more users and the classes of regions adjusted by the previously-selected editing operations. The presented set of editing options can be based on the most common of the previously-selected editing options selected for the identified class of the detected region. The method can include receiving a definition of a new class of region from a user, and associating one or more editing options from the full set of editing options to the new class of region.

A method includes, in some implementations, detecting a region portion of an image based on one or more characteristics of one or more pixels of the image. A class of the detected region is identified, where the class is selected from multiple identifiable classes. Each of the identifiable classes of regions is associated with a different set of one or more editing options, and each editing option in each set is associated with one or more edit operations operable to adjust one or more values of one or more pixels of an image. The method presents one of the sets of editing options for selection, where each of the presented editing options is appropriate for the determined class of the region. Each of the presented editing options is operable to adjust one or more values of one or more pixels of the detected region in response to being selected. In some implementations, at least one of the sets of editing options can include at least one type of editing option that is different from the types of editing options in at least one other set. The presented set of editing options can include multiple editing options having different types, where each type of editing option includes one or more edit operations different from edit operations of the other types of editing options.

In some implementations, a system can include a storage device and at least one processor accessing the storage device and operative to perform operations. The operations include detecting a region portion of an image based on one or more characteristics of one or more pixels of the image. The detected region has an identified class selected from multiple identifiable classes, and each of the identifiable classes of regions is associated with a set of multiple editing options. Each editing option is associated with one or more edit operations operable to adjust one or more values of one or more pixels of an image. One of the sets of editing options is presented for selection, where the presented set is associated with the identified class of the detected region and each of the presented editing options is operable to adjust one or more values of one or more pixels of the detected region. The presented set of editing options is different from at least one of the other sets of editing options associated with the other classes.

In various implementations of the system, the presented set of editing options includes multiple different types of editing options, each type of editing option including one or more edit operations different from edit operations of the other types of editing options. The different types of editing options can include a blur operation that blurs a pixel and a plurality of neighboring pixels in the detected region, a noise reduction operation that reduces noise in the detected region, a local contrast enhancement operation that adjusts the contrast of one or more pixels in the detected region relative to pixels neighboring the one or more pixels in the detected region, and/or a sharpening operation that causes a pixel value to differ from one or more neighboring pixels in the detected region.

DETAILED DESCRIPTION

Figure 1:
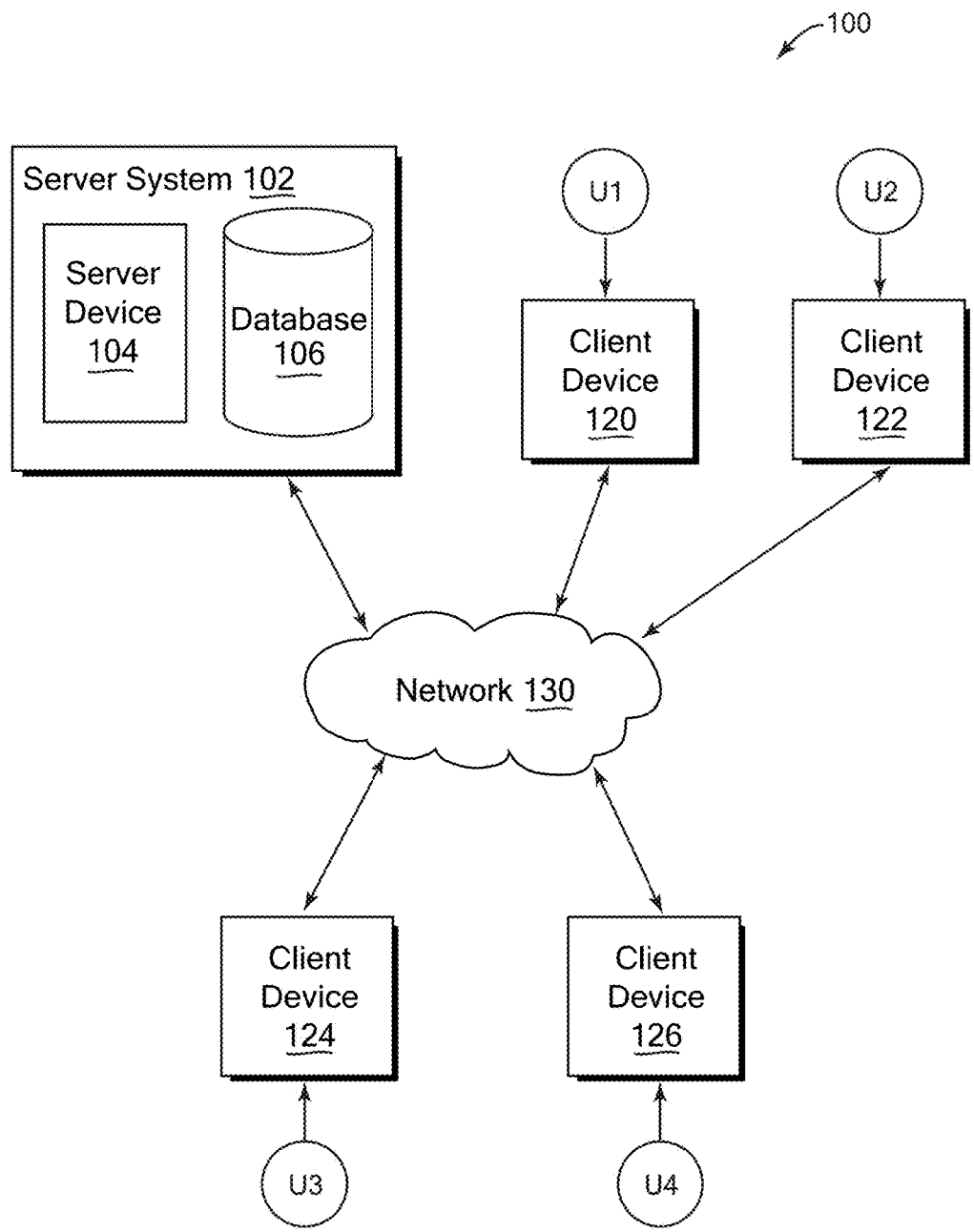
FIG. 1 is a block diagram of an example network environment which may be used for one or more implementations described herein.

One or more implementations described herein relate to editing options for image regions. Various implementations allow editing options to be provided for image regions based on the classes of those regions. For example, if a user indicates a region of an image, suitable editing options for the class of the indicated region are presented to the user for selection. This allows a user to easily select regions as well as choose from appropriate editing options for those regions, promoting easier, quicker, and higher-quality image editing operations.

In example implementations, the system can detect a region of an image based on one or more characteristics of pixels of the image. For example, the characteristics can include color, texture, or location within the image. In some implementations, the system can automatically segment the image into multiple regions including the detected region. The system also identifies a class for the detected region based on the characteristics, where the class is selected from multiple classes identifiable by the system. For example, the identifiable classes can include a face class and/or classes for facial features within faces (such as eyes, teeth, mouths, eyebrows, etc.) which can be detected using facial recognition techniques. Identifiable classes can also include a sky class, foliage class, building class, and/or other classes.

Each identifiable class of region is associated with a set of multiple editing options, and each editing option is associated with one or more edit operations operable to adjust one or more values of pixels of an image. At least one of the classes is associated with a set of editing options that is different than the other sets of editing options associated with the other classes. For example, this allows a different, appropriate set of editing options to be associated with each class, if desired. Each set of editing options can thus be made particularly appropriate for the class of the detected region.

The system presents one of the sets of editing options for selection which is associated with the identified class of the detected region. This set of editing options can be displayed to a user, e.g., in response to receiving user input indicating (e.g., located at) the region in the image. For example, the user input can include hovering a pointer over the region or tapping the region. Each of the presented editing options is operable, if selected, to adjust one or more values of one or more pixels of the detected region. In some implementations, other features can also be provided. For example, the system can present the most common editing options previously selected for a class by one or more users of a system or service. Some implementations allow a user to define a new class of region, where the user or system selects a subset of editing options from the full set of editing options to associate with the new class of region.

Disclosed features can allow pertinent and appropriate editing options to automatically be presented to a user editing an image. For example, a user need not know which editing options out of a full and numerous set of options are best suited to a class of region he or she wants to edit. Instead, features herein can present those options to the user. Furthermore, the user need not employ time-consuming and complex tasks to select a desired region for editing, since features herein can automatically select a region based on a simple indication of the user, such as hovering a pointer over an area of an image or tapping an area of an image. Thus, a technical effect of region indication and automatic presentation of appropriate editing options as disclosed herein include the reduction in duration of editing images, thus saving a user time, energy, and resources for achieving edits to images. Another technical effect is a higher quality of edits to images resulting from more appropriate editing options being applied to images by users, and more consistent application of similar editing options across classes of regions in various images.

FIG. 1 illustrates a block diagram of an example network environment 100, which may be used in some implementations described herein. In some implementations, network environment 100 includes one or more server systems, such as server system 102 in the example of FIG. 1. Server system 102 can communicate with a network 130, for example. Server system 102 can include a server device 104 and a database 106 or other storage device. Network environment 100 also can include one or more client devices, such as client devices 120, 122, 124, and 126, which may communicate with each other via network 130 and/or server system 102. Network 130 can be any type of communication network, including one or more of the Internet, local area networks (LAN), wireless networks, switch or hub connections, etc.

For ease of illustration, FIG. 1 shows one block for server system 102, server device 104, and database 106, and shows four blocks for client devices 120, 122, 124, and 126. Server blocks 102, 104, and 106 may represent multiple systems, server devices, and network databases, and the blocks can be provided in different configurations than shown. For example, server system 102 can represent multiple server systems that can communicate with other server systems via the network 130. In another example, database 106 and/or other storage devices can be provided in server system block(s) that are separate from server device 104 and can communicate with server device 104 and other server systems via network 130. Also, there may be any number of client devices. Each client device can be any type of electronic device, such as a computer system, laptop computer, portable device, cell phone, smart phone, tablet computer, television, TV set top box or entertainment device, display glasses or goggles, wristwatch, personal digital assistant (PDA), media player, game device, etc. In other implementations, network environment 100 may not have all of the components shown and/or may have other elements including other types of elements instead of, or in addition to, those described herein.

In various implementations, end-users U1, U2, U3, and U4 may communicate with the server system 102 and/or each other using respective client devices 120, 122, 124, and 126. In some examples, users U1-U4 may interact with each other via a social network service implemented on server system 102, where respective client devices 120, 122, 124, and 126 transmit communications and data to one or more server systems such as system 102, and the server system 102 provides appropriate data to the client devices such that each client device can receive content uploaded to the social network service via the server system 102. In some examples, the social network service can include any system allowing users to perform a variety of communications, form links and associations, upload and post shared content, and/or perform other socially-related functions. For example, the social network service can allow a user to send messages to particular or multiple other users, form social links in the form of associations to other users within the social network system, group other users in user lists, friends lists, or other user groups, post or send content including text, images, video sequences, audio sequences or recordings, or other types of content for access by designated sets of users of the social network service, send multimedia information and other information to other users of the social network service, participate in live video, audio, and/or text chat or teleconferencing with other users of the service, etc. As used herein, the term "social networking service" can include a software and/or hardware system that facilitates user interactions, and can include a service implemented on a network system.

A user interface can enable display of images and other content as well as communications, privacy settings, notifications, and other data on a client device 120, 122, 124, and 126. Such an interface can be displayed using software on the client device, such as application software or client software in communication with the server system. The interface can be displayed on an output device of a client device, such as a display screen.

Other implementations of features described herein can use any type of system and service. For example, any type of electronic device can make use of features described herein. Some implementations can provide these features on client or server systems disconnected from or intermittently connected to computer networks. In some examples, a client device having a display screen can display images and provide features and results as described herein that are viewable to a user.

Figure 2:
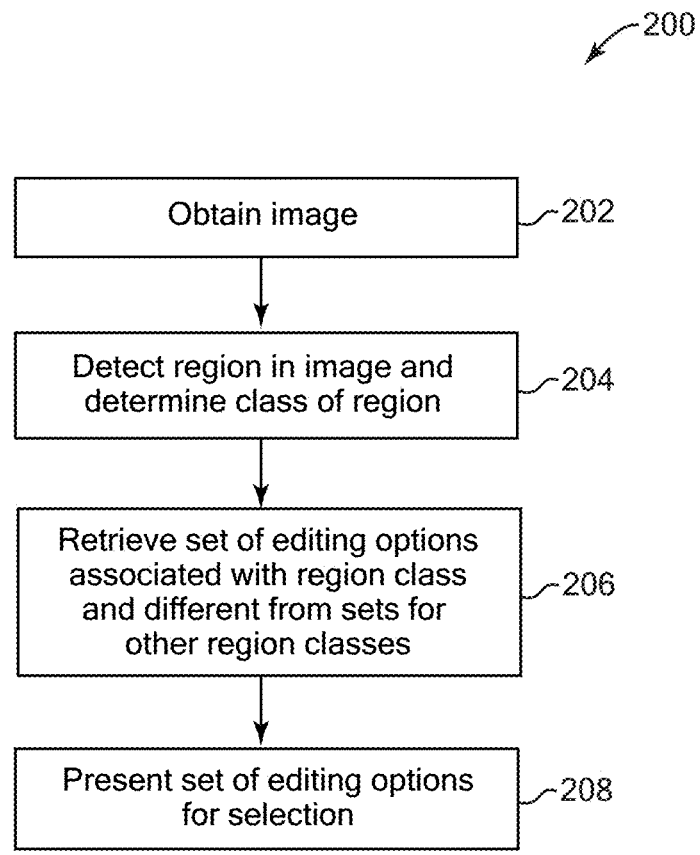
FIG. 2 is a flow diagram illustrating an example method for editing image regions based on previous user edits, according to some implementations.

FIG. 2 is a flow diagram illustrating one example of a method 200 for providing editing options for image regions. In some implementations, method 200 can be implemented, for example, on a server system 102 as shown in FIG. 1. In other implementations, some or all of the method 200 can be implemented on a system such as one or more client devices, and/or on both a server system and a client system. In described examples, the implementing system includes one or more processors or processing circuitry, and one or more storage devices such as a database 106 or other storage. In some implementations, different components of one or more servers and/or clients can perform different blocks or other parts of the method 200. Method 200 can be implemented by computer program instructions or code, which can be executed on a computer, e.g., implemented by one or more processors, such as microprocessors or other processing circuitry and can be stored on a computer program product including a computer readable medium, such as a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, method 200 can be implemented in hardware (logic gates, etc.), or in a combination of hardware and software. The method 200 can be performed as part of or component of an application running on the system, or as an application or software running in conjunction with other applications and operating system.

In some implementations, method 200 can be initiated based on user input. A user may, for example, have selected the initiation of the method 200 from an interface such as an application interface, a social networking interface, or other interface. In other implementations, the method 200 can be initiated automatically by a system. For example, the method 200 (or parts thereof) can be periodically performed, or performed based on one or more particular events or conditions such as a user opening an application such as an editing application, receiving one or more images that have been newly uploaded to or accessible by the system, etc. In some implementations, such conditions can be specified by a user in custom preferences of the user. In one non-limiting example, method 200 (or parts thereof) can be performed on a camera, cell phone, or other client device that has captured one or more images. In addition or alternatively, the client device can send images to a server over a network, and the server can process the images using method 200.

In block 202 of method 200, the method obtains an image for processing. The image can be a digital image composed of multiple pixels, for example, and can be stored on one or more storage devices of the system or otherwise accessible to the system, such as a connected storage device, e.g., a local storage device or storage device connected over a network. For example, the image can be a photo captured by a camera, an image frame extracted from a captured video stream or other video data, or derived from a different source. In some implementations, a user can provide or designate one or more images to process. In other implementations, the image can be automatically selected by the method, e.g., as an image from an album or other collection of multiple images, such as an album provided in an account of a user of a social networking system. In some examples, the system can determine which image to obtain based on evaluating one or more characteristics of accessible images, such as the color distributions of images, timestamps and other metadata of images, and/or identified and recognized content depicted in the images, such as persons, faces, or objects.

In block 204, the method detects a region in the image and determines a class of the region. The region can be detected based on one or more characteristics of pixels of the image. The region is a portion or sub-area of the image including a number of the image's pixels, for example. In some implementations, the class of the region can be based on a subject depicted in the region, such as a face, a location, an object, or other subject. Multiple different classes are identifiable and distinguishable by the method, and one of these classes is assigned to the detected region based on the characteristics of the pixels of the region. In some implementations or cases, the method can detect a region (e.g., based on particular characteristics such as color) and then identify its class (e.g., based on other characteristics of the detected region). In other implementations or cases, the method can detect a region and identify its class approximately simultaneously. For example, if a region is detected by looking for particular characteristics, these characteristics may also be unique enough to identify the class of that region.

The region can be detected and its class determined using any of a variety of techniques. In some examples or implementations, one class of detected region can be faces of people, or facial skin of people, and this type of region and class can be identified based on looking for facial features such as eyes, nose, mouth, eyebrows, etc. in an area of the image. Individual facial features themselves can also be classes of detected regions in some implementations. For example, a mouth, eyes, and eyebrows can each be a class of region. In some implementations, depictions of different objects can be defined as region classes and can be detected in the image, such as foliage (e.g., tree leaves, grass, bushes, or other plant features), vehicles (car, truck, boat, etc.), articles or items (bottle, pen, phone, chair, etc.), or buildings or other structures. These objects can be detected and their classes determined using a variety of techniques that search for features or characteristics common to such objects, such as particular shapes, proportions, colors, brightnesses, surrounding features, etc. In some other examples, the class of region can be an area, location, or landscape feature depicted in the image, such as a sky or portion thereof, a mountainside, foliage (e.g., tree or group of trees, an area covered by grass, etc.), a lake, a river, etc., and can be detected (and class determined) using techniques searching for features unique to such features, such as color, texture, location in the image, relation to other detected features, etc. Some examples are described in greater detail below.

Each of the identifiable classes of regions is associated with a set of multiple editing options, and each editing option is associated with one or more edit operations that are operable to adjust one or more values of one or more pixels of an image. The pixel values can be, for example, RGB (red, green, blue) values, HSV (hue, saturation, value) values, HSL (hue, saturation, lightness) values, or other values used to determine the appearance of a pixel. Examples of such editing options are described in greater detail below.

In block 206, the method retrieves a set of one or more editing options associated with the identified region class. In some examples, the set can include multiple editing options. For instance, the set of editing options can be retrieved from storage such as memory or other storage device accessible to the method 200. The retrieved set is different from at least one other set of editing options associated with other identifiable region classes. For example, the retrieved set can include a different number of editing options and/or different types of editing options than other sets of editing options associated with other identified classes. This allows different classes of regions to be associated with different sets of editing options. In some implementations, the retrieved set of editing options is appropriate for the class of the detected region and therefore has been associated with that class. Other classes of regions may be associated with other, different sets of editing options which are appropriate for those classes. Some implementations can previously associate the retrieved set of editing options with the identified class so that the method retrieves the previously-associated set, while in other implementations the method can select the appropriate set of editing options for the identified region class from multiple available editing options.

An "appropriate" editing option for a particular class of region, in general or common cases, provides a more effective and/or pleasing result in the appearance of that class of image region to an average viewer of the image as compared to "inappropriate" editing options. Appropriateness can be based on whether an editing option is commonly used for a particular region class, and/or whether the editing option is effective at modifying the appearance of the region without undesirable image effects (noise, reduction of detail (desirable for some classes), increase in detail (desirable for other classes), etc.) An appropriate editing option for a particular class can be determined in any of a variety of ways. For example, expert users can determine which editing options are most often used and/or function with the most pleasing results for particular classes, based on their experience. In some implementations, appropriate editing options can be determined based on examining previous edits of images, and/or previous edits from the same user and/or multiple users, where appropriate edit options are those options most often previous selected for the particular class of region.

In block 208, the method presents the retrieved set of editing options for selection. For example, the method can cause the retrieved set of editing options to be displayed on a display device of a client or server device in an editing application or interface which a user has opened for the purpose of editing the image. The user can then select any one of the presented editing options to edit the image according to the one or more edit operations of the selected option. In other implementations, the retrieved set of editing options can be presented to other methods and/or systems for use in editing images automatically.

Thus, the method allows a set of editing options to be presented, which are appropriate to a detected region. This allows a user, for example, to be presented with suitable editing options for a particular region of interest within an image, without the user having to know in advance which editing options are best used with a particular class of region. Thus, less effort and resources are needed for a user to effectively edit an image. Some implementations can also provide such options for image regions that are pointed to or otherwise simply indicated by a user without having to select the detected region in any involved way, as described below in greater detail.

Figure 3:
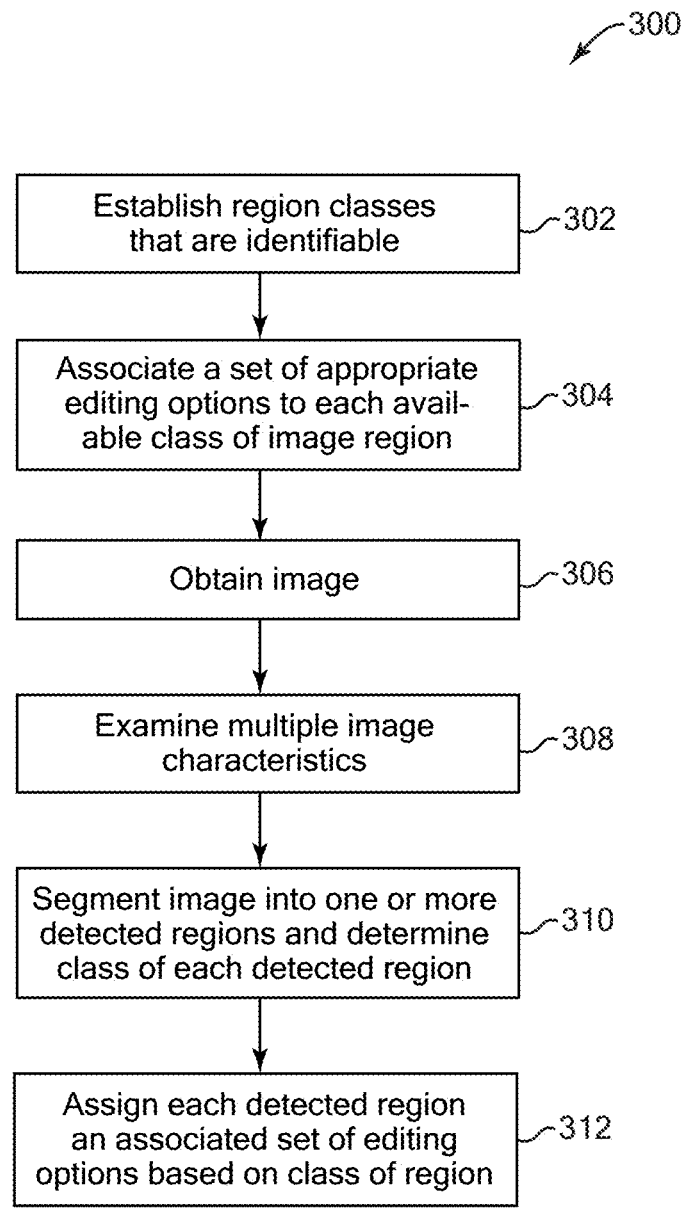
FIG. 3 is a flow diagram illustrating an example method for editing image regions based on previous user edits from a single previously-edited source image, according to some implementations.

FIG. 3 is a flow diagram illustrating an example method 300 for associating editing options to one or more regions in an image, according to some implementations. Method 300 can be implemented by a system such as a server and/or client device as described above for method 200.

In block 302, the method establishes multiple classes of regions that are identifiable. The class of a region can be identified based on one or more characteristics of the region. In some cases, the same characteristics of pixels that allow a region to be detected are also used to identify the class of the region. For example, a face class of region can be detected in an image by looking for facial features, and finding these facial features also establishes the region as having a face class. In other cases, a region may be detected based on some characteristics and its class determined based on other characteristics. For example, a region may be detected based on finding pixels having the same color or texture, and its class can be determined based on the color of those pixels and the location of those pixels relative to the borders of the image. Each of the multiple identifiable classes can be associated with one or more characteristics and/or rules used to identify those classes in an image. As described above, region classes can include a face class (which can be defined as just the facial skin of a face, if other facial features are defined as their own individual classes), classes of individual facial features (eyes, eyebrows, nose, mouth), a sky class, a foliage class (and/or subclasses including grass, leaves, etc.), a building class, a pavement class, or other classes of objects (vehicles, items, etc.). Information describing such classes and rules can be stored in storage devices accessible to the method.

In some implementations, a user can define new, custom classes for regions in images. For example, a user can input one or more characteristics and/or conditions which, if found in region of an image, can establish the presence of the custom class. Such information defining the new class can be stored and accessible to the system performing method 300 and/or 400. In one example, the user can input characteristics of a certain color which is to be searched for, and/or a particular location in an image which the region should be located (e.g., upper half, upper-right quadrant, etc.). The user can also define particular characteristics or regions which should surround a region to qualify it with the custom class, such as in the eye region being surrounded by a facial skin color. In some implementations, a user can provide samples of the custom class of region which the method can examine to find similar regions in an image. For example, the user can trace particular regions in images using existing editing tools or functions, for which the user desires to define a custom class.

In block 304, the method associates a set of appropriate editing options with each identifiable class of image region. The method is operative to identify the multiple available classes of regions in images that were established in block 302 described above. The method can read the available sets of editing options from storage device(s) accessible to the method. A set of editing options can include multiple editing options. Each of the sets of editing options is a different subset of a full set of editing options available for the editing application or other application or operating system in which the image can be opened. In some implementations, a different set of editing options can be associated with each of at least two of the identifiable classes, or with each of all of the identifiable classes. Further, in some implementations, at least one of the sets of editing options (each set associated with a respective region class) includes at least one type of editing option that is different than the types of editing options in at least one of the other sets of editing options associated with other identified classes. Such features can allow different sets of editing options, and/or different types of editing options, to be associated with different image region classes, thus allowing sets of options that are appropriate for different classes of image regions and can be highly tailored and/or customized to those different classes.

An editing option includes one or more edit operations. Each edit operation changes a characteristic of one or more pixels of an image. For example, an edit operation can change a color (e.g., R, G, or B), hue, brightness, saturation, contrast, or similar value or characteristic of a pixel. An edit operation can also be a more complex operation, such as a convolution operation in which a particular pixel and/or one or more neighboring pixels adjacent to that particular pixel (or within a group of pixels surrounding the particular pixel) are changed in one or more characteristics. For example, an edit operation can be a smoothing or blur operation which averages the color and/or brightness of pixels surrounding a center pixel to create a smoothing effect. An edit operation can be a noise reduction operation which can remove noise in color or other characteristics of a group of pixels while preserving details such as edges. A local contrast enhancement operation can be another edit operation that changes the contrast of a pixel or the region relative to neighboring pixels. A sharpening (or "structure") operation can be another edit operation (e.g. a particular form of local contrast enhancement) in which a particular pixels' values are made as different as possible from the values of neighboring pixels to provide the appearance of a sharper edge. Any or all of these convolution operations can be included as edit operations.

In addition, in some implementations, a particular editing option can include multiple individual edit operations. For example, an editing option of "smooth" for a face class of region may include a blur operation as well as a brightness-changing operation. An editing option of "whiten teeth" in a mouth class of region can include a saturation edit operation (e.g., de-saturating yellow hues in the teeth) as well as an operation to increase brightness of the teeth.

Herein, a "type" of editing option refers to an editing option that causes a particular set of one or more edit operations to be performed. Each type of editing option causes a different set of edit operations to be performed. For example, one type of editing option can cause a color edit operation to be performed, in which a color of one or more pixels is changed. Another type of editing option can cause a saturation value of one or more pixels to be changed. Another distinct type of editing option can cause a blur operation, while a different type can cause a sharpening operation. In some cases, one type of editing option can cause multiple edit operations to be performed, such as a type of editing option that causes a hue value and a saturation value of a pixel to change, or a type of editing option that causes a luminance value to change and performs a smoothing operation.

Some types of editing options adjust a color appearance of their associated class of region, while other types do not. For example, an editing option that includes a color or saturation modification changes the appearance of color in the region to the user. In contrast, an editing option that includes one or more convolution operations, such as blur/smoothing, noise reduction, sharpening, and structure operations, modify pixel values to achieve a different effect in the region than color appearance change.

Each set of editing options can be different. For example, sets can include different numbers of editing options, e.g., one class of region can be associated with a set of five editing options, while a different class can be associated with a set of four editing options. In some implementations, a set of editing options can be different by including one or more different types of editing options from one or more (or all) other sets. Such features allow each set to be made appropriate for a particular class of image region in some implementations. For example, each set of editing options can be appropriate to the particular class to which it is associated.

For instance, a face class of image region may be most appropriate for editing options such as "smooth" because a user may wish to blur and reduce the appearance of facial blemishes, and may be appropriate for "brighten" to make a face more visible in an image since faces are often the intended focus of images. Other appropriate options may include "change color" to allow a user to alter hues, "reduce noise" to remove noise artifacts on the face, and "adjust warmth" to allow a user to increase or decrease "warm" hue values of the face such as reds, magentas, etc. In contrast, other classes of regions may not be as appropriate for one or more of these options. For example, a sky class of region may not be as appropriate for a "smooth" option because sky regions typically already have less detail than faces and would generally not need to be blurred. In some other examples, a sky class of image region may be best suited for editing options such as "reduce noise" and not for "sharpen detail" (since a sky is generally a background region in which more detail is not desired). A foliage class of image region may be best suited for editing options such as "sharpen detail" and not for "reduce noise" (since noise reduction techniques may remove texture details in foliage).

The appropriateness (suitability) of a particular editing option for a particular class of region can be determined in a variety of ways, as described above. For example, expert image-editing users can decide beforehand which editing options function best with which classes of image regions, based on their experience. In other implementations, the method can examine the opinions and/or editing activities of a particular user and/or multiple users, and determine which editing operations are most often used with which classes of image regions. For example, editing activities of multiple users of a social networking service or other networked or online service can be examined (e.g., with the users' permissions) to determine which editing options should be in the set associated with each particular class of image region.

Furthermore, in some implementations, a set of editing options (e.g., one or more sets, or each set of editing options) can include multiple different types of editing options. This allows a user to select an option from a menu having a variety of different types of edits to the indicated region, providing more flexibility in editing for a user.

Each association of a particular image region class with a set of editing options can be stored in storage device(s) available to the method 300. These associations can later be examined for display of editing options as described below with respect to FIG. 4. For example, the association data can be stored as a look up table in which a class can be looked up to find its associated set of editing options.

In block 306, the method obtains an image. This block can be similar to block 202 described above with reference to figure two. In some implementations, a user can select the image. For example, a user can input a command to open a particular image for editing in editing application or other application. In other implementations, the image can be obtained for method 300 automatically, such as receiving an image from or selecting an image from a particular source device or storage device, e.g., over a network, from a user's album, etc. Block 306 can be performed any time after blocks 302 and 304.

In block 308, the image examines multiple image characteristics. This block is performed in order to find one or more regions within the image and to classify those regions in the next block. A variety of different image characteristics can be examined. For example, pixel characteristics (in any model used, such as RGB, HSV, HSL, HSI, etc.) such as color (e.g., RGB values), hue, brightness or luminance, saturation, or other pixel characteristics can be examined. A distribution of any of these characteristics in the image can also be examined, such as in a histogram. In some implementations, a characteristic of texture in areas of the image can be examined, such as texture provided by colors of multiple pixels, where a texture characteristic such as frequency can be determined (e.g., the spacing between regularly spaced features appearing within the examined area of the image). Some implementations can detect a region based on other characteristics of pixels or an area, such as the location of the region within the image frame (e.g., near the top border of the image, near the bottom of the image, near a side of the image, near the center of the image, etc.). Some implementations can detect image characteristics and features adjacent to or surrounding a detected region, such as color characteristics, line or edge features, etc. Various implementations can examine multiple or combinations of different characteristics.

In block 310, the method segments the image into one or more detected regions and determines the class of each detected region. This is performed using the characteristics and/or other signals found in the image in block 308. In one example, the method detects a face class of region by looking for particular ranges of colors typically found in faces, and/or looking for facial features such as eyes, mouth, eyebrows, ears, and nose in a predetermined spatial configuration. The facial features can themselves be detected based on their size relative to a face, color, spacing from other facial features, etc. For example, a mouth can be detected based on location points found surrounding the mouth that define a bounding box around the mouth having a predetermined size, shape, and location relative to other facial features such as nose and eyes.

In another example, the method can detect a sky class of region by looking for particular colors, such as finding a particular cluster of blue hues in a hue distribution such as a histogram or hue wheel derived from the image. Colors of features within the region can also be sought, such as white or gray colors for clouds that can also indicate a sky class of region. The sky class of region can also be determined by looking at the location of a particular region (e.g., a group of adjacent pixels having a predetermined color) relative to the image frame (e.g., borders), where a sky region would be typically located near the top border of the image. In another example, the method can detect a foliage class of region by looking for particular colors, such as green or yellow hues, in a region defined by adjacent pixels having these hues. In addition, the method can check for particular textures in such a region, such textures indicating leaf patterns or grass patterns in a foliage class of region. Other classes of regions can also be detected in other implementations, such as different types of objects (vehicle, article, building, landscape feature, etc.) as described above.

As a result of block 310, the image can be segmented into multiple detected regions having a class assigned to each region. Information describing this segmentation can be stored in storage device(s) for access by the method 300 and/or 400. In other implementations, the image is not segmented into regions in method 300; e.g., a region can be detected and classified after user input in received as in method 400 of FIG. 4.

In block 310, the method assigns each detected region to an associated set of editing options based on the class of the region. For example, the set of editing options assigned to each detected region can be determined from the stored associations of sets of editing options with different classes of regions as determined in block 302. Thus, for example, a particular class of detected region is matched in the association data and the stored set of edit options associated with that class is assigned to that detected region.

Figure 4:
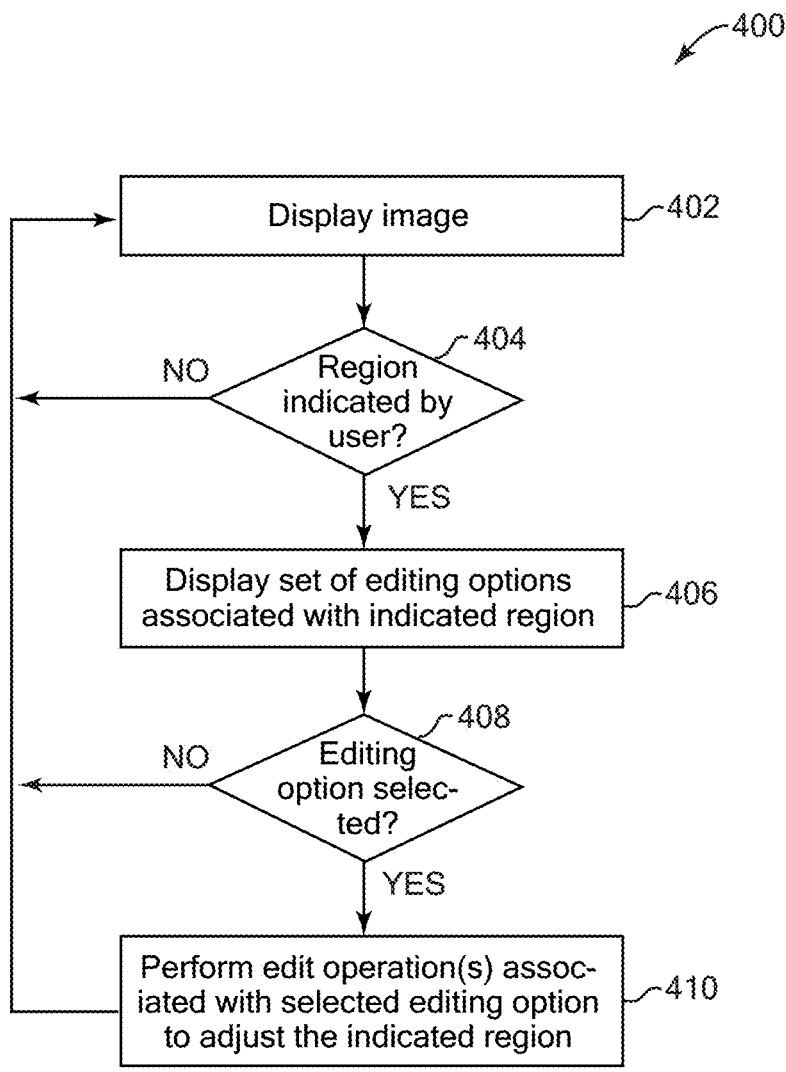
FIG. 4 is a flow diagram illustrating another example method for editing image regions based on previous user edits from multiple previously-edited source images, according to some implementations.

FIG. 4 is a flow diagram illustrating an example method 400 for presenting editing options for a region in an image, according to some implementations. Method 400 can be implemented by a system such as a server and/or client device as described above for method 200. In some implementations, method 400 can be initiated after method 300 of FIG. 3, where the image processed in method 400 is the same as the obtained image processed in method 300. In other implementations, method 400 can be initiated after other conditions or events, e.g., using any obtained image previously processed or not.

In block 402, the method displays an image. For example, the image may be displayed by display device in an editing application or other type of application. A user, for example, may have commanded the image to be displayed in the application so that the user can edit the image. In other cases, the image may be displayed in a social networking application, viewing application for viewing content, or other application.

In block 404, the method checks whether a region in the displayed image is indicated by a user. The region can be indicated by a user with user input directed at the region. In some implementations, the user input can be a simple pointing action and need not include a selection by dragging a pointer or other cursor (e.g., to resize a selection box) or by tracing an outline of a particular region with a cursor. For example, the user can indicate the region by hovering a user-controlled displayed pointer or other cursor over the region in the image. For instance, the hovering can include maintaining a pointer within a threshold distance of a particular location for a predetermined length of time, such as a few seconds. The method can then determine whether the particular location is within a detected region. Alternatively, a user can click on an area of the image that is included in a particular region, e.g., push a physical button while a pointer is at a location. In other implementations, a user can indicate the region by tapping a location on the image, where the location is within the region. For example, many portable devices include a touchscreen that serves as an output device for displaying images and as an input device for receiving touch input from the user. The user can tap a location in the image by touching the touch screen at the desired displayed location in the image. If the location indicated by the user is included in a detected region of the image, then that detected region is considered to be indicated by the user. If the location indicated by the user is not included in a detected region of the image, then no regions are indicated and the method returns to block 402.

If a region is indicated by a user, then the method continues to block 406, in which the method displays (or otherwise presents) the set of editing options that is associated with the indicated region. As described above with respect to block 310 of FIG. 3, each region in the image has been previously associated with a set of edit options, and this set of edit options is displayed in block 406. The presented set of editing options is different from one or more of the other sets of editing options associated with the other identifiable classes of image regions, thus allowing an appropriate set of particular types of editing options to be displayed for any class of an indicated region as described above. In some implementations, the presented set of editing options includes multiple different types of editing options as described above, providing more flexibility in editing for a user.

In other implementations, there may be no previous associations of editing options associated with the detected region, and/or there may not be previously segmented regions in the image. In such cases, the required processing can be performed by the method to detect whether an image has been indicated, identify a class for the region, and/or determine which set of editing options is associated with the identified class, similar to appropriate blocks of FIG. 3.

The editing options can be displayed in any of a variety of formats. For example, the editing options can be displayed in a vertical menu, where each editing option is displayed as a label in a vertical column of labels. In other implementations, the editing options can be displayed as icons (e.g., each icon having an associated text description that is displayed when a pointer is hovered over the icon), horizontal labels, or icons/labels in other configurations. The editing options can be displayed near the location where the user indicated the region, such as near a hovered pointer or a tapped location in the image. Other implementations can display the editing options in other areas of a graphical interface, such as in a dedicated field or window, or in a new pop-up window in the interface.

In block 408, the method checks whether one of the displayed edit options has been selected, e.g., by the user (or program). For example, the user can select one of the edit options by controlling a displayed pointer and interface device or by touching a touchscreen at the location of the desired editing option. If no editing option is selected, the method returns to block 402.

If an editing option is selected, then in block 410 the method performs the one or more edit operations associated with the selected editing option to adjust one or more pixel values in the indicated region. As described above with reference to block 302 of FIG. 3, each editing option can include one or more edit operations that modify one or more characteristics of pixels of the image. In some implementations, the method performs these modifications to all the pixels of the indicated region. In other implementations, the method performs the modifications to a subset of the pixels of the indicated region, where the subset can be selected by the user, can be determined by the method, and/or can be determined by location indicated by the user and by the particular operations performed. For example, if the user selects an editing option to "whiten teeth" of a mouth region, then the method can determine which pixels of the indicated mouth region should be modified by the operations of that selected option. The pixels to be modified can include pixels portraying the teeth but not include pixels portraying lips or other parts of the mouth (e.g., where such pixels can be distinguished via their color and/or shape). If a user selects to smooth a face region, then facial features within the face (such as eyes, mouth, etc.) can be detected based on color, shape, etc., and excluded from the blur operation.

Furthermore, some editing options can prompt the user for additional input after being selected. For example, a color adjustment options can display a slider bar or input field and ask the user for a new color value to which to change the region, and upon receiving the value, the color operation changes the pixel values in the region to that value. Other editing options can use additional user input to select particular areas within the region that the associated operations will adjust.

After performing the selected edit operation(s), the method can return to block 402.

Various blocks and operations of methods 200-400 can be performed in a different order than shown and/or at least partially simultaneously, where appropriate. For example, some implementations can perform blocks 302-304 at various times and/or based on events not related to a user editing an image. Blocks 306-312 can be performed for multiple images before any of those images are edited in method 400. In some implementations, blocks or operations of methods 200-400 can occur multiple times, in a different order, and/or at different times in the methods. In some implementations, the methods 200, 300, and/or 300 can be implemented, for example, on a server system 102 as shown in FIG. 1. In some implementations, one or more client devices can perform one or more blocks instead of or in addition to a server system performing those blocks.

Figure 5:
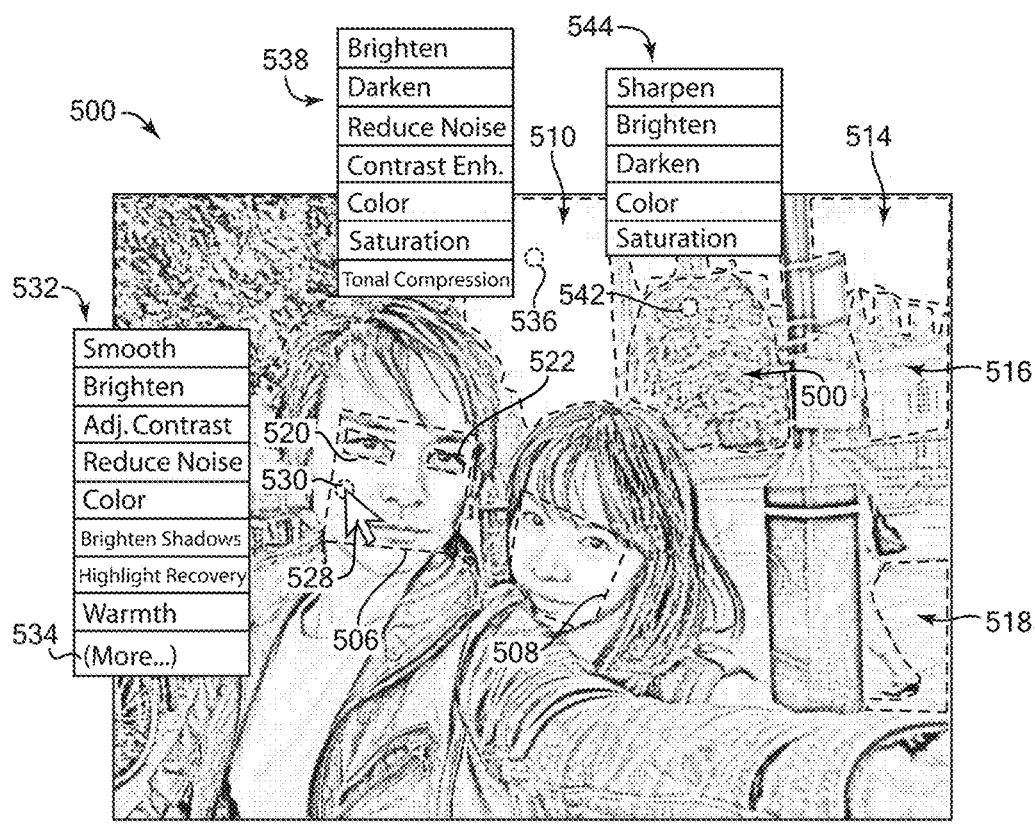
FIG. 5 is a diagram illustrating example implementations using the methods of FIGS. 3 and 4.

FIG. 5 is a diagram illustrating an example implementation of the methods of FIGS. 3 and 4 using an example image 500. In some implementations or applications, the shown image 500 can be received from a variety of sources, such as memory, storage drives, or other storage of one or more users, and can be stored in a variety of formats, such as an image in the user's photo albums, an image frame in a movie or other video sequence, etc. The image can be processed as described below by a client or server device. In some implementations, the image can be displayed on a display device, e.g., of a client device 120, 122, 124, and/or 126 of FIG. 1, or a server system 102 in some implementations. In one non-limiting example, the user can view the image displayed by a display device in a graphical interface provided by a client device or server device.

In some implementations, the image 500 can be associated with (e.g., owned by or accessible by) a single particular user, e.g., stored on a particular user's account on a system. This allows custom editing options and/or preferences of that user to be used for images. Other users can similarly have their own custom editing options, preferences, and images stored for their own use. Other implementations can share images and/or custom editing options of a particular user with multiple users. In one example, a second user can view a first user's custom sets of editing options, and can designate to the system that one or more those sets of editing options are acceptable to the second user. Those first-user sets of editing options can then be presented for the second user's images.

In this example of FIG. 5, image 500 is obtained by the system and can be analyzed to detect one or more regions as described above with reference to FIG. 3. In image 500, the system has detected face regions 506 and 508, as well as sky region 510, tree region 512, sky region 514, building region 516, and pavement region 518. The dashed lines in FIG. 5 indicate the extent of detected regions but need not be displayed in some implementations. These regions can be detected using a variety of techniques, some of which are described above. For example, face regions 506 and 508 can be detected using facial recognition techniques that examine the image for certain facial features, such as eyes, mouth, eyebrows, and nose that are positioned within particular spatial configurations. In some implementations, the detected face region 506 can be defined by a face bounding box (or polygon) that borders a region around the detected facial features of the face. In other implementations, a defined face region can further include skin areas adjacent to and outside the bounding box that have a similar color to the skin areas within the bounding box. In this example, eye regions 520 and 522 have also been detected by the system, along with the other facial features of eyebrows, nose, and mouth features near these eyes to detect face 506. In this example, the eyes 520 and 522 are detected as their own regions similar to the other regions described herein. Thus, the face regions 506 and 508 can be defined as just the facial skin areas within the bounding boxes that exclude any facial features (such as eyes 520 and 522) that are defined as their own separate regions.

The sky regions 510 and 514 can be detected and identified as a sky region class by looking for particular characteristics of pixels of the image 500. For example, the system can check for color such as hues within the range of blue or gray hues, as well as position of a region of pixels having an appropriate color. Here the sky regions 510 and 514 are positioned adjacent to the top border of the image 500, and so are detected as sky regions. The tree region 512 can be detected and identified, for example, by detecting a green color for the area of adjacent pixels, and by detecting a texture of the leaves of the tree. The building region 516 can be detected and identified based on characteristics such as straight edges (e.g., detected using known edge detectors for images such as Hough line transform, etc.), color (grays, whites, etc.), and location within the image (e.g., closer to the top half of image). Pavement region 518 can be detected and identified based on characteristics such as parallel lines within the region, color (gray, black, etc.), and position within the image borders (e.g., closer to bottom half of image).

In some implementations, the image 500 is analyzed for all detectable regions, e.g., before the image is opened and displayed to be edited by a user. In other implementations, the image 500 can be analyzed for detectable regions at the time displayed regions are indicated by the user, such as regions in an image location underneath a pointer or cursor or tapped by a user.

Image 500 can be displayed in an editor application or other program. In this example, the user controls a displayed pointer 528, which can be controlled by pointing device such as a mouse, trackball, stylus, etc. The user hovers the pointer 528 at the location 530, which is within the detected region 506. This action causes a menu 532 to be displayed for the region 506. Menu 532 includes multiple editing options which are each selectable by the user using pointer 528. The menu 532 can be displayed close to the pointer 528 and location 530, for example, or can be displayed in another area of a graphical interface. In other implementations, the location 530 or other location within region 506 may have been tapped by a user, e.g., on a touch screen, to cause the menu 532 to be displayed.

Menu 532 includes editing options that are appropriate to the class of the face region 506. For example, the editing options include various types of editing options to smooth pixels, brighten pixels, adjust contrast, reduce noise, change color, brighten shadows (e.g., fill light to recover detail in shadow tones), recover highlights (e.g., darken over-exposed or clipped highlight tones), and adjust "warmth" (e.g., increase warmth by raising temperature of white point of region, and/or boosting magenta, red, orange, or pink tones (such as hue and saturation of highlight and shadow tones), etc.) of pixels of the detected region 506. These editing options have been predetermined to be most appropriate and suitable for facial regions such as region 506. For example, these editing options may be selected by one or more expert users, or can be the most common or typical editing options previously used by one or more users of the system or accessible service for regions of a face class. A menu similar to menu 532 can be displayed in response to facial region 508 being indicated by the user.

In some implementations, an extending option such as option 534 can also be displayed in a menu of editing options such as menu 532. Option 534, when selected by the user, causes additional editing options to be displayed. These additional editing options can be selected from a full list of editing options provided by the editing application or other application. This feature allows a user to select an editing option that may not be displayed in menu 532.

Other examples of menus 538 and 544 presenting editing options are also shown in FIG. 5. (In some implementations, only one of the menus 532, 538, and 544 are displayed at any one time based on the most recent region indicated by the user.) For example, in sky region 510, a user has tapped the location 536 using a touch screen, which the system determines to be in sky region 510 and causes menu 538 to be displayed. Menu 538 presents editing options that are suitable for a sky class of region. For example, the menu includes various types of editing options to brighten or dark in the region, reduce noise in the region, perform a local contrast enhancement in the region, change the color, change saturation (e.g., for blue hues of a sky class of region), or perform tonal compression (e.g., dark and light tones on the extremes of a histogram of the region are compressed toward the middle of the histogram) of pixels of the region 510. For example, no smoothing option is presented because such an option is typically not appropriate or suitable for a sky region. Some implementations can present an extension option similar to option 534 to allow a user to select additional editing options if desired. Sky region 514 can present a menu similar to menu 538 if the user hovers over, taps, or otherwise indicates region 514.

In another example, a user has tapped the location 542 which the system determines to be located within the tree region 512. The menu 544 is displayed in response to that user input. Menu 544 includes editing options suitable for a foliage class of region such as tree region 512. For example, menu 544 includes options to sharpen, brighten, darken, change color, or change saturation of pixels of the region 512. In some implementations, the "change saturation" option can change only appropriate hues for the class of region. For example, for the foliage class, the appropriate hues relevant to foliage can be yellow and green hues, and other hues would not be changed. Editing options such as sharpening details are not presented in the menus for facial region 506 and the sky region 510 because such an option is typically not performed in those classes of regions (although in some implementations, such options can be accessed with further input, such as selecting a "More" option 534 as in menu 532).

Other classes of regions can be identified in some implementations. For example, building region 516 has been detected to portray a building and to have a building class, and a suitable menu of editing options can be displayed in response to a user indicating region 516. Similarly, the pavement region 518 has been detected and identified to portray pavement or similar surface, and a suitable menu of editing options can be displayed in response to the user indicating region 518. Other images may include regions having classes such as water, animals (or specific types of animals such as birds, dogs, etc.), objects, and so on, each associated with their own set of editing options that may have different types of options than other sets and which are appropriate for their associated classes. For example, a water class of region may include sharpen, noise reduction, brighten, darken, color, saturation, and local contrast enhancement options, while an animal class may include sharpen, brighten, local contrast enhancement, and noise reduction options.

In some implementations, as described above, a user may be able to define a new class of region, e.g., define a custom class of region. For example, the user may be able to use a drawing tool or similar feature of an application to trace or otherwise delineate a region within image 500. The user can also provide conditions or characteristics to examine in an image to detect that class of region. The user can also select desired editing options from the full set of available editing options, and the selected editing options would be presented as the set of editing options in a menu when that class of region is indicated by a user, e.g., similarly to the menus described above.

Figure 6:
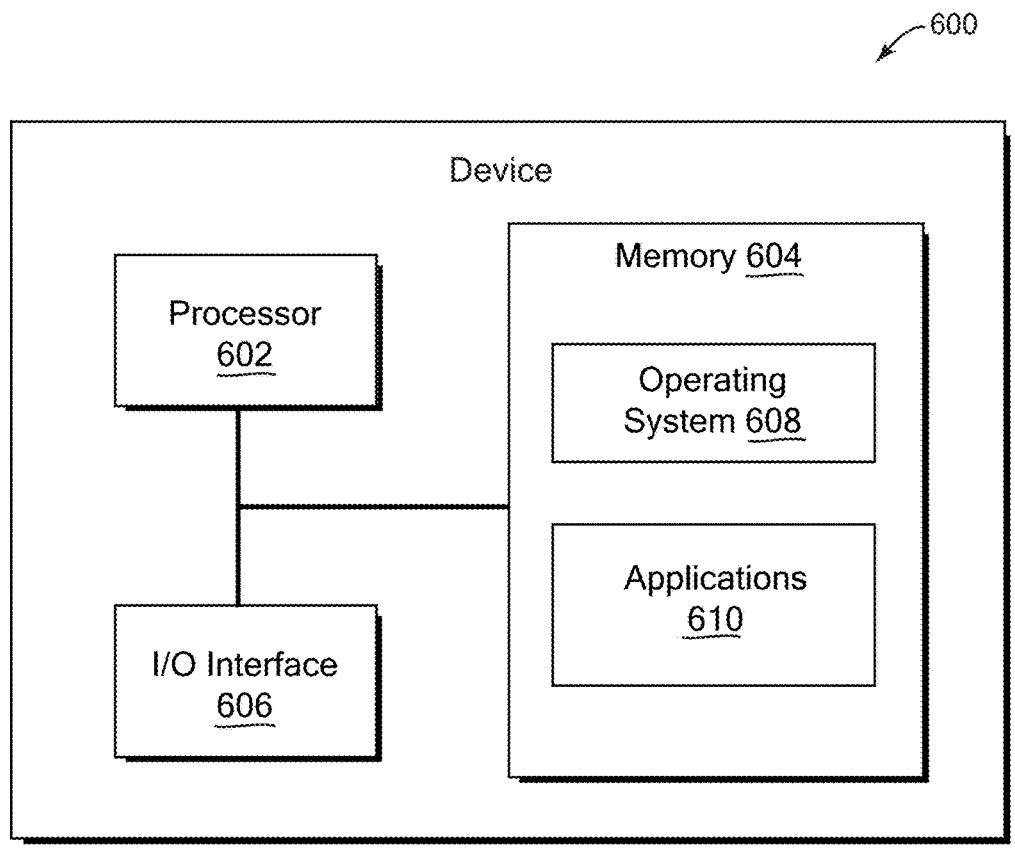
FIG. 6 is a block diagram of an example device which may be used for one or more implementations described herein.

FIG. 6 is a block diagram of an example device 600 which may be used to implement one or more features described herein. In one example, device 600 may be used to implement server device 104 of FIG. 1, and perform appropriate method implementations described herein. Device 600 can be any suitable computer system, server, or other electronic or hardware device. For example, the device 600 can be a mainframe computer, desktop computer, workstation, portable computer, or electronic device (portable device, cell phone, smart phone, tablet computer, television, TV set top box, personal digital assistant (PDA), media player, game device, etc.). In some implementations, device 600 includes a processor 602, a memory 604, and input/output (I/O) interface 606.

Processor 602 can be one or more processors or processing circuits to execute program code and control basic operations of the device 600. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 604 is typically provided in device 600 for access by the processor 602, and may be any suitable processor-readable storage medium, such as random access memory (RAM), read-only memory (ROM), Electrical Erasable Read-only Memory (EEPROM), Flash memory, etc., suitable for storing instructions for execution by the processor, and located separate from processor 602 and/or integrated therewith. Memory 604 can store software operating on the device 600 by the processor 602, including an operating system 608 and one or more applications engines 610 such as a graphics editing engine, web hosting engine, social networking engine, etc. In some implementations, the applications engines 610 can include instructions that enable processor 602 to perform the functions described herein, e.g., some or all of the methods of FIGS. 2, 3, and/or 4. Any of software in memory 604 can alternatively be stored on any other suitable storage location or computer-readable medium. In addition, memory 604 (and/or other connected storage device(s)) can store images, classes of regions, sets of editing options, associations between classes and editing options, and other data used in the features described herein. Memory 604 and any other type of storage (magnetic disk, optical disk, magnetic tape, or other tangible media) can be considered "storage devices."

I/O interface 606 can provide functions to enable interfacing the device 600 with other systems and devices. For example, network communication devices, storage devices such as memory and/or database 106, and input/output devices can communicate via interface 606. In some implementations, the I/O interface can connect to interface devices such as input devices (keyboard, pointing device, touchscreen, microphone, camera, scanner, etc.) and output devices (display device, speaker devices, printer, motor, etc.).

For ease of illustration, FIG. 6 shows one block for each of processor 602, memory 604, I/O interface 606, and software blocks 608 and 610. These blocks may represent one or more processors or processing circuitries, operating systems, memories, I/O interfaces, applications, and/or software modules. In other implementations, device 600 may not have all of the components shown and/or may have other elements including other types of elements instead of, or in addition to, those shown herein. While system 102 is described as performing steps as described in some implementations herein, any suitable component or combination of components of system 102 or similar system, or any suitable processor or processors associated with such a system, may perform the steps described.

A client device can also implement and/or be used with features described herein, such as client devices 120-126 shown in FIG. 1. Example client devices can include some similar components as the device 600, such as processor(s) 602, memory 604, and I/O interface 606. An operating system, software and applications suitable for the client device can be provided in memory and used by the processor, such as client group communication application software. The I/O interface for a client device can be connected to network communication devices, as well as to input and output devices such as a microphone for capturing sound, a camera for capturing images or video, audio speaker devices for outputting sound, a display device for outputting images or video, or other output devices. A display device, for example, can be used to display the settings, notifications, and permissions as described herein, where such device can include any suitable display device such as an LCD, LED, or plasma display screen, CRT, television, monitor, touchscreen, 3-D display screen, or other visual display device. Some implementations can provide an audio output device, such as voice output or synthesis that speaks text and/or describes settings, notifications, and permissions.

Although the description has been described with respect to particular implementations thereof, these particular implementations are merely illustrative, and not restrictive. Concepts illustrated in the examples may be applied to other examples and implementations.

In situations in which the systems discussed here may collect personal information about users, or may make use of personal information, users may be provided with an opportunity to control whether programs or features collect user information (e.g., images depicting the user, information about a user's social network, user characteristics (age, gender, profession, etc.), social actions or activities, a user's preferences, or a user's current location). In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, a user may have control over how information is collected about the user and used by a server.

Note that the functional blocks, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed such as procedural or object-oriented. The routines may execute on a single processing device or multiple processors. Although the steps, operations, or computations may be presented in a specific order, the order may be changed in different particular implementations. In some implementations, multiple steps or blocks shown as sequential in this specification may be performed at the same time.

What is claimed is:

1. A method comprising:

receiving a definition of a user-defined class of image region from a user, wherein the definition includes one or more defined image characteristics of the image region;

associating a defined set of editing options with the user-defined class of image region, wherein the defined set of editing options is selected from a plurality of available editing options, each editing option in the defined set being associated with at least one edit operation that adjusts a respective set of one or more pixel values of the image region;

detecting a region of an image based on one or more characteristics of one or more pixels of the image, wherein the detected region is a portion of the image that excludes at least one pixel of the image;

determining an identified class of the detected region from a plurality of identifiable classes of regions, wherein each of the plurality of identifiable classes of regions is associated with a respective set of one or more editing options, each editing option in each set being associated with one or more edit operations that adjust a respective set of one or more pixel values of the image, wherein the identified class is determined as the user-defined class based on a determination that one or more image characteristics of the detected region match the one or more defined image characteristics of the image region included in the definition of the user-defined class;

examining previously-selected editing options selected by multiple users of an online networked service to change pixel values of images;

examining classes of regions that include the changed pixel values from the previously-selected editing options;

determining a resulting set of editing options that include editing options selected from the previously-selected editing options based on a frequency of selection of the previously-selected editing options for the identified class of the detected region by the multiple users, wherein the resulting set of editing options are included in the set of one or more editing options associated with the identified class;

presenting the resulting set of editing options for selection, wherein each of the editing options in the resulting set adjusts a respective set of one or more pixel values of the detected region in response to being selected, and wherein the resulting set of editing options is different from at least one of the other sets of editing options associated with the identifiable classes other than the user-defined class; and providing the definition of the user-defined class and the resulting set of editing options to one or more devices such that each editing option in the resulting set of editing options is available for selection by one or more other users with respect to one or more other images associated with the one or more other users, wherein the resulting set of editing options is configured to be presented for selection by the one or more other users in response to one or more image characteristics of one or more detected regions of the one or more other images matching the one or more defined image characteristics of the user-defined class.

2. The method of claim 1 wherein the one or more defined image characteristics are one or more image characteristics of an area of the image region delineated by input received via a drawing tool.

3. The method of claim 1 wherein the one or more defined image characteristics include one or more colors of pixels in the image region.

4. The method of claim 1 wherein the one or more defined image characteristics include a location of the image region with respect to one or more image borders.

5. The method of claim 4 wherein the location of the image region with respect to the one or more image borders includes a location within a defined image area, wherein the defined image area is at least one of a center area surrounding a center image position, or a quadrant of the image region.

6. The method of claim 1 wherein at least one editing option of the resulting set of editing options includes a convolution operation that changes a pixel value of a first pixel in the detected region and changes a pixel value of at least one pixel in a region neighboring the first pixel.

7. The method of claim 6 wherein the convolution operation includes at least one of:
   a blur operation that blurs the first pixel and a plurality of neighboring pixels in the detected region;
   a noise reduction operation that reduces noise in the detected region;
   a local contrast enhancement operation that adjusts contrast of one or more pixels in the detected region relative to pixels neighboring the one or more pixels in the detected region; and
   a sharpening operation that causes the pixel value of the first pixel to differ from pixel values of one or more neighboring pixels of the first pixel.

8. The method of claim 1 wherein the definition of the user-defined class includes one or more second image characteristics of one or more image features surrounding the image region associated with the user-defined class, wherein the one or more second image characteristics includes pixel color.

9. The method of claim 1 wherein detecting the region includes examining a plurality of different image characteristics to detect the region and determine the identified class, and wherein the plurality of different image characteristics include a texture provided by colors of pixels in the image, wherein the texture includes regularly spaced features appearing within the image.

10. The method of claim 1 wherein detecting the region includes automatically segmenting the image into a plurality of regions including the detected region, and wherein determining the identified class of the detected region includes automatically identifying the classes of the segmented regions.

11. The method of claim 1 wherein the defined set of editing options is presented for selection in response to receiving user input indicating the detected region in the image, wherein the user input includes at least one of hovering a pointer over the detected region and tapping the detected region.

12. The method of claim 1 further comprising:
   receiving a selection of one of the resulting editing options; and
   causing the one or more editing operations associated with the selected resulting editing option to be performed on the detected region.

13. The method of claim 1 wherein the plurality of identifiable classes include classes of different types including one or more of a face class, a landscape class, or a building class.

14. The method of claim 1 wherein the resulting set of editing options is available for selection on the one or more devices in response to an acceptance received from the one or more other users.

15. A nontransitory computer readable medium having stored thereon program instructions that, when executed by a processor, cause the processor to perform operations comprising:
   receiving a definition of a user-defined class of image region from a user, wherein the definition includes one or more defined image characteristics of the image region;
   associating a defined set of editing options to the user-defined class of image region, wherein the defined set of editing options is selected from a plurality of available editing options, each editing option in the defined set being associated with one or more edit operations that adjust a respective set of one or more pixel values of the image region;
   detecting a region of an image based on one or more characteristics of one or more pixels of the image, wherein the detected region is a portion of the image that excludes at least one pixel of the image;
   determining an identified class of the detected region from a plurality of identifiable classes of regions, wherein each of the plurality of identifiable classes of regions is associated with a respective set of one or more editing options, each editing option in each set being associated with one or more edit operations that adjust a respective set of one or more pixel values of the image, wherein the identified class is determined as the user-defined class based on a determination that one or more image characteristics of the detected region match the one or more defined image characteristics of the image region included in the definition of the user-defined class;
   examining previously-selected editing options selected by multiple users of an online networked service to change pixel values of images;
   examining classes of regions that include the changed pixel values from the previously-selected editing options;
   determining a resulting set of editing options that include editing options selected from the previously-selected editing options based on a frequency of selection of the previously-selected editing options for the identified class of the detected region by the multiple users, wherein the resulting set of editing options are included in the set of one or more editing options associated with the identified class;
   presenting the resulting set of editing options for selection, wherein each editing option of the resulting set of editing options adjusts a respective set of one or more pixel values of the detected region in the image in response to being selected, and wherein the resulting set of editing options is different from at least one of the other sets of editing options associated with the identifiable classes other than the user-defined class; and providing the definition of the user-defined class and the resulting set of editing options to one or more devices such that each editing option in the resulting set of editing options is available for selection by one or more other users with respect to one or more other images associated with the one or more other users, wherein the resulting set of editing options is configured to be presented for selection by the one or more other users in response to one or more image characteristics of one or more detected regions of the one or more other images matching the one or more defined image characteristics of the user-defined class.

16. The method of claim 15 wherein the definition of the user-defined class includes one or more second image characteristics of one or more image features surrounding the image region associated with the user-defined class, wherein the one or more second image characteristics includes pixel color, wherein the one or more defined image characteristics are obtained from an image area selected by a user in a defining image, and wherein the one or more defined image characteristics include a location in the image area, wherein the image area is a particular quadrant of the defining image.

17. A system comprising:
a storage device; and
at least one processor accessing the storage device and operative to perform operations comprising:
detecting a region of an image based on one or more characteristics of one or more pixels of the image, wherein the region is a portion of the image that excludes at least one pixel of the image;
determining an identified class of the detected region selected from a plurality of identifiable classes of regions, wherein the identified class is a user-defined class of image region previously defined by user input, wherein the identified class is determined as the user-defined class of image region based on a determination that one or more image characteristics of the detected region match one or more defined image characteristics of the user-defined class, wherein the user-defined class is associated with a set of editing options previously defined by user input, each editing option being associated with one or more edit operations that adjust one or more values of one or more pixels of the image;
examining previously-selected editing options selected by multiple users of an online networked service to change pixel values of images;
examining classes of regions that include the changed pixel values from the previously-selected editing options;
determining a resulting set of editing options that include editing options selected from the previously-selected editing options based on a frequency of selection of the previously-selected editing options for the identified class of the detected region by the multiple users, wherein the resulting set of editing options are included in the set of editing options that is associated with the identified class;
presenting the resulting set of editing options for selection, wherein each of the editing options in the presented resulting set adjusts one or more values of one or more pixels of the detected region in response to being selected, and wherein the presented resulting set of editing options is different from at least one other set of editing options associated with identifiable classes of regions other than the identified class; and
providing the definition of the user-defined class and the resulting set of editing options to one or more devices such that each editing option in the resulting set of editing options is available for selection by one or more other users with respect to one or more other images associated with the one or more other users, wherein the resulting set of editing options is configured to be presented for selection by the one or more other users in response to one or more image characteristics of one or more detected regions of the one or more other images matching the one or more defined image characteristics of the user-defined class.

18. The system of claim 17 wherein the one or more defined image characteristics are obtained from an image area selected by the user input in a defining image, and wherein the one or more defined image characteristics include a location in the image area, wherein the image area is a particular quadrant of the defining image.

* * * * *